United States Patent
Sunavala et al.

(10) Patent No.: US 9,729,441 B2
(45) Date of Patent: Aug. 8, 2017

(54) SERVICE FUNCTION BUNDLING FOR SERVICE FUNCTION CHAINS

(71) Applicant: Futurewei Technologies, Inc., Plano, TX (US)

(72) Inventors: Farhad P. Sunavala, San Ramon, CA (US); Mark Xiang-Quan Huang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 119 days.

(21) Appl. No.: 14/879,785

(22) Filed: Oct. 9, 2015

(65) Prior Publication Data
US 2017/0104679 A1    Apr. 13, 2017

(51) Int. Cl.
| H04L 12/28 | (2006.01) |
| H04L 12/741 | (2013.01) |
| H04L 29/12 | (2006.01) |
| H04L 12/721 | (2013.01) |
| G06F 9/455 | (2006.01) |

(52) U.S. Cl.
CPC .......... *H04L 45/74* (2013.01); *G06F 9/45558* (2013.01); *H04L 45/72* (2013.01); *H04L 61/2007* (2013.01); *G06F 2009/45595* (2013.01); *H04L 61/6022* (2013.01)

(58) Field of Classification Search
CPC ..... H04L 45/74; H04L 61/2007; H04L 45/72; H04L 61/6022; G06F 9/45558; G06F 2009/45595
See application file for complete search history.

(56) References Cited

U.S. PATENT DOCUMENTS

| 2009/0217264 A1* | 8/2009 | Heller ............... G06F 9/45558 718/1 |
| 2011/0184993 A1* | 7/2011 | Chawla ............... G06F 9/45533 707/802 |

(Continued)

FOREIGN PATENT DOCUMENTS

| CN | 103346981 A | 10/2013 |
| CN | 104518935 A | 4/2015 |
| CN | 104734931 A | 6/2015 |

OTHER PUBLICATIONS

"Network Function Virtualisation (NFV)," Update White Paper, Issue 1, Oct. 15-17, 2013, 16 pages.

(Continued)

*Primary Examiner* — Clemence Han
(74) *Attorney, Agent, or Firm* — Conley Rose, P.C.

(57) ABSTRACT

A packet forwarding method that includes receiving a packet from a traffic classifier at a host that comprises a virtual machine (VM), and a first hypervisor for the host that provides a first set of routing instructions that provides routing instruction to forward the packet to a port of the VM, and wherein the VM comprises a plurality of virtual network functions (VNFs), and a second hypervisor for the VM that provides a second set of routing instructions that provides routing instructions to forward the packet to the plurality of VNFs based on an input, processing, by the host, the packet using the plurality of VNFs in accordance with the first set of routing instructions and the second set of routing instructions, and forwarding, by the host, the processed packet to a network device.

20 Claims, 7 Drawing Sheets

(56) References Cited

U.S. PATENT DOCUMENTS

| | | | | |
|---|---|---|---|---|
| 2014/0310704 | A1* | 10/2014 | Cantu | G06F 9/45558 |
| | | | | 718/1 |
| 2014/0317293 | A1* | 10/2014 | Shatzkamer | G06F 9/455 |
| | | | | 709/226 |
| 2015/0026681 | A1 | 1/2015 | Lin et al. | |
| 2015/0234725 | A1 | 8/2015 | Cillis et al. | |
| 2015/0319088 | A1* | 11/2015 | Wenig | H04L 45/745 |
| | | | | 370/392 |
| 2016/0149774 | A1* | 5/2016 | Chastain | H04L 43/028 |
| | | | | 370/241 |
| 2016/0179582 | A1* | 6/2016 | Skerry | G06F 9/5077 |
| | | | | 718/1 |
| 2016/0239330 | A1* | 8/2016 | Mc Bride | G06F 9/45558 |
| 2016/0299830 | A1* | 10/2016 | Chastain | G06F 9/45558 |
| 2016/0328252 | A1* | 11/2016 | Singh | G06F 9/455 |
| 2016/0337272 | A1* | 11/2016 | Berman | H04L 49/70 |
| 2016/0352578 | A1* | 12/2016 | Chen | H04L 43/0811 |
| 2016/0380848 | A1* | 12/2016 | Raney | H04L 43/028 |
| | | | | 709/213 |
| 2017/0048110 | A1* | 2/2017 | Wu | H04L 41/12 |
| 2017/0078216 | A1* | 3/2017 | Adolph | H04L 47/70 |

OTHER PUBLICATIONS

Partial English Translation and Abstract of Chinese Patent Application No. CN104518935, Apr. 15, 2015, 29 pages.
Partial English Translation and Abstract of Chinese Patent Application No. CN104734931, Jun. 24, 2015, 20 pages.
Foreign Communication From A Counterpart Application, PCT Application No. PCT/CN2016/099071, English Translation of International Search Report dated Dec. 15, 2016, 4 pages.

* cited by examiner

SERVICE FUNCTION BUNDLING FOR SERVICE FUNCTION CHAINS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtualization is the ability to simulate a hardware platform, such as a server, storage device, or network resource, in software. Hardware that supports virtualization may be off-the-shelf platforms. These hardware platforms may be used to provide a virtualized solution that may be more portable, scalable, and cost-effective than a traditional hardware-based solution.

SUMMARY

In one embodiment, the disclosure includes a packet forwarding method comprising receiving a packet from a traffic classifier at a host that comprises a virtual machine (VM), and a first hypervisor for the host that provides a first set of routing instructions that provides routing instruction to forward the packet to a port of the VM, and wherein the VM comprises a plurality of virtual network functions (VNFs), and a second hypervisor for the VM that provides a second set of routing instructions that provides routing instructions to forward the packet to the plurality of VNFs based on several factors such as input port (port of the VM where the packet is received), or fields inside the packet such as Media Access Control (MAC) Destination Address (DA), MAC Source Address (SA), source Internet Protocol (IP), destination IP, protocol, Layer four (L4) ports, etc., processing, by the host, the packet using the plurality of VNFs in accordance with the first set of routing instructions and the second set of routing instructions, and forwarding, by the host, the processed packet to a network device.

In another embodiment, the disclosure includes a host comprising a receiver configured to receive a packet from a traffic classifier, a transmitter configured to forward a processed packet to a network device, a memory, and a processor operably coupled to the receiver, the transmitter, and the memory, and configured to implement a VM and a first hypervisor for the host that provides a first set of routing instructions that provides routing instruction to forward the packet to a port of the VM, wherein the VM comprises a plurality of VNFs, and a second hypervisor for the VM that provides a second set of routing instructions that provides routing instructions to forward the packet to the plurality of VNFs based on several factors such as input port (port of the VM where the packet is received), or fields inside the packet such as MAC DA, MAC DA, source IP, destination IP, protocol, L4 ports, etc., and process the packet using the plurality of VNFs in accordance with the first set of routing instructions and the second set of routing instructions.

In yet another embodiment, the disclosure includes a packet forwarding method comprising receiving a packet from a traffic classifier at a host that comprises a VM, and a first hypervisor for the host that provides a first set of routing instructions that provides routing information between the host and the VM, and wherein the VM comprises a plurality of VNFs, and a second hypervisor for the VM that provides a second set of routing instructions that provides routing instructions between a port on the VM and a data port on each VNF from a plurality of VNFs, and processing, by the host, the packet using the VNFs in accordance with the first set of routing instructions and the second set of routing instructions, wherein the first set of instructions provides routing instructions to forward the packet to the port of the VM, and wherein the second set of routing instructions provides routing instructions to forward the packet to the plurality of VNFs based on several factors such as input port (port of the VM where the packet is received), or fields inside the packet such as MAC DA, MAC DA, source IP, destination IP, protocol, L4 ports, etc., and forwarding, by the host, the processed packet to a network device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
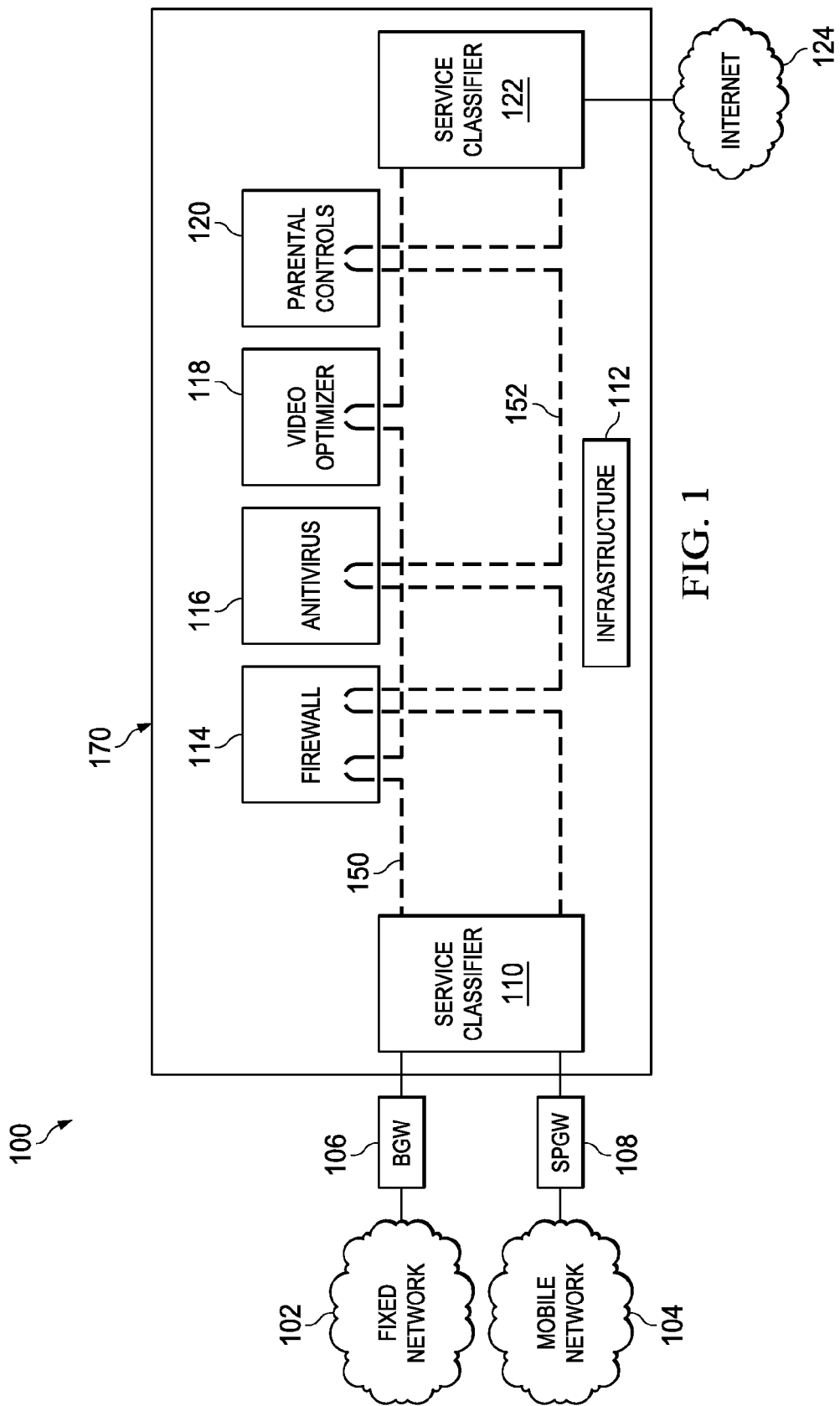
FIG. 1 is a block diagram of an embodiment of a service delivery network implementing service function chaining.

It should be understood at the outset that although an illustrative implementation of one or more embodiments are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Computer virtualization has dramatically altered the information technology (IT) industry in terms of efficiency, cost, and the speed in providing new applications and/or services. The trend continues to evolve towards network virtualization, where a set of tenant end points, such as VMs or hosts, may communicate in a virtualized network environment that is decoupled from an underlying physical network, such as a data center (DC) physical network. Virtualization eliminates the dependency between a network function (NF) and its hardware, as seen in typical physical network appliances by creating a standardized execution environment and management interfaces for the VNFs. Virtualization results in the sharing of the physical hardware by multiple VNFs in the form of VMs. VNFs can be flexibly instantiated, moved, or deleted. Managing the operations of these VNFs, such as adding new services or increasing the capacity of a service, may require reconfiguration of multiple network devices such as routers, switches, or servers. The reconfiguration process may be complex and the chance for errors may be high. Existing systems route service function chains across multiple network devices to sequentially implement VNFs. Modifying VNFs for a service function chain may require adding or removing network devices along the service function chain, which may be complex and expensive.

Disclosed herein are various embodiments for implementing service function chains using service function bundles. A service function chain is an ordered set of service functions and ordering constraints that is applied to data packets, data frames, and/or data flows. A service function chain may comprise one or more service function paths along the service function chain. A service function path may also be referred to as an explicit path, for example, a predetermined path that traverses two or more network devices. A service function bundle may be implemented using a VM that comprises a plurality of service functions or VNFs that are routed within the service function bundle. The terms "service function" and "VNF" may be used interchangeably throughout this disclosure. A service function bundle may comprise one or more VNFs within a single VM. A VNF is a function that specifies a specific treatment for a data packet. VNFs are functions that can act at various layers of a protocol stack, for example, at the network layer or other open system interconnection (OSI) layers. A VNF can be realized as a virtual element or embedded in a physical network element. One or more VNFs can be embedded in the same network element. Multiple occurrences or instances of the VNF can exist in the same domain. A VNF may also be referred to as a VNF instance when multiple instances exist. As such, the terms "VNF" and "VNF instance" may be used interchangeably. Examples of VNFs include, but are not limited to, firewalls, wide area network (WAN) and application acceleration, deep packet inspection (DPI), lawful interception (LI), server load balancing, network address translation (NAT)-44, NAT-64, Internet Protocol version 6 network prefix translation (NPTv6), HOST_ID injection, hypertext transfer protocol (HTTP) header enrichment functions, and transmission control protocol (TCP) optimization. Routing VNFs within a service function bundle simplifies packet flow routing. Further, reconfiguring VNFs for a service function chains may be performed locally on the host using a service function bundle without disturbing the rest of the network. Service function bundling allows load balancers to be employed on a per service function bundle basis rather than on a per service function basis, which may reduce the number of load balancers that are necessary. Packet flows can be routed to service function bundles rather than individual service function, which simplifies packet flow routing. Latencies may also be reduced due to the simplified packet flow routing. Using service function bundling also simplifies orchestration and improves overall system performance.

FIG. 1 is a block diagram 100 of an embodiment of a service delivery network 170 implementing service function chaining. The service delivery network 170 may be coupled to a fixed network 102, a mobile network 104, or combinations thereof. Fixed network 102 may be coupled to any number of client computing devices (not shown). Fixed network 102 is coupled to the service delivery network 170 through a broadband network gateway 106. Similarly, mobile network 104 is connected to the service delivery network 170 via a service provider gateway 108. The broadband network gateway 106 and the service provider gateway 108 act as access devices and provide security, network address translation, and similar services from traffic between service delivery network 170 and fixed network 102 and mobile network 104, respectively. Upstream traffic from the broadband network gateway 106 may be directed by service classifier 110 through one or more of VNFs, such as a Firewall 114 VNF, an antivirus 116 VNF, a video optimizer 118 VNF, or a parental control 120 VNF. Similarly, downstream traffic from the internet is directed by service classifier 122 through one or more of the VNFs in the service function chain. The service classifiers 110 and 122 are functions that perform classification and support routing by appending a Network Service Header (NSH) on packets to cause them to be routed to the desired VNFs. As such, the service classifiers 110 and 122 create service paths for traffic 150 and 152 to traverse the desired VNFs (e.g. Firewall 114, antivirus 116, video optimizer 118, parental control 120, etc.) before being forwarded from the service delivery network 170 to the Internet 124. Service classifiers 110 and 122 perform an initial classification upon each traffic flow upon entering service delivery network 170. Service classifiers 110 and 122 may also perform non-initial (e.g. subsequent) classification as needed and to alter or create new service paths for traffic flows. Each of the elements within the service delivery network 170 may be coupled by one or more internal networks. The service delivery network 170 comprises infrastructure 112, which may include a data network and a management network to couple and support communication between the elements in the service delivery network 170. Any number of VNFs may be implemented in a service delivery network 170.

Traffic from different external networks, such as fixed network 102 and/or mobile network 104 and/or different devices on the external networks may be directed to specific services or sequences of services in the VNFs. For example, traffic 150 to and from fixed network 106 is directed by the service classifiers 110 and 122 to firewall 114 VNF, antivirus 116 VNF, and parental control 120 VNF. Traffic 152 to and from the mobile network 104 is directed by the service classifiers 110 and 122 to firewall 114 VNF and video optimizer 118 VNF.

Figure 2:
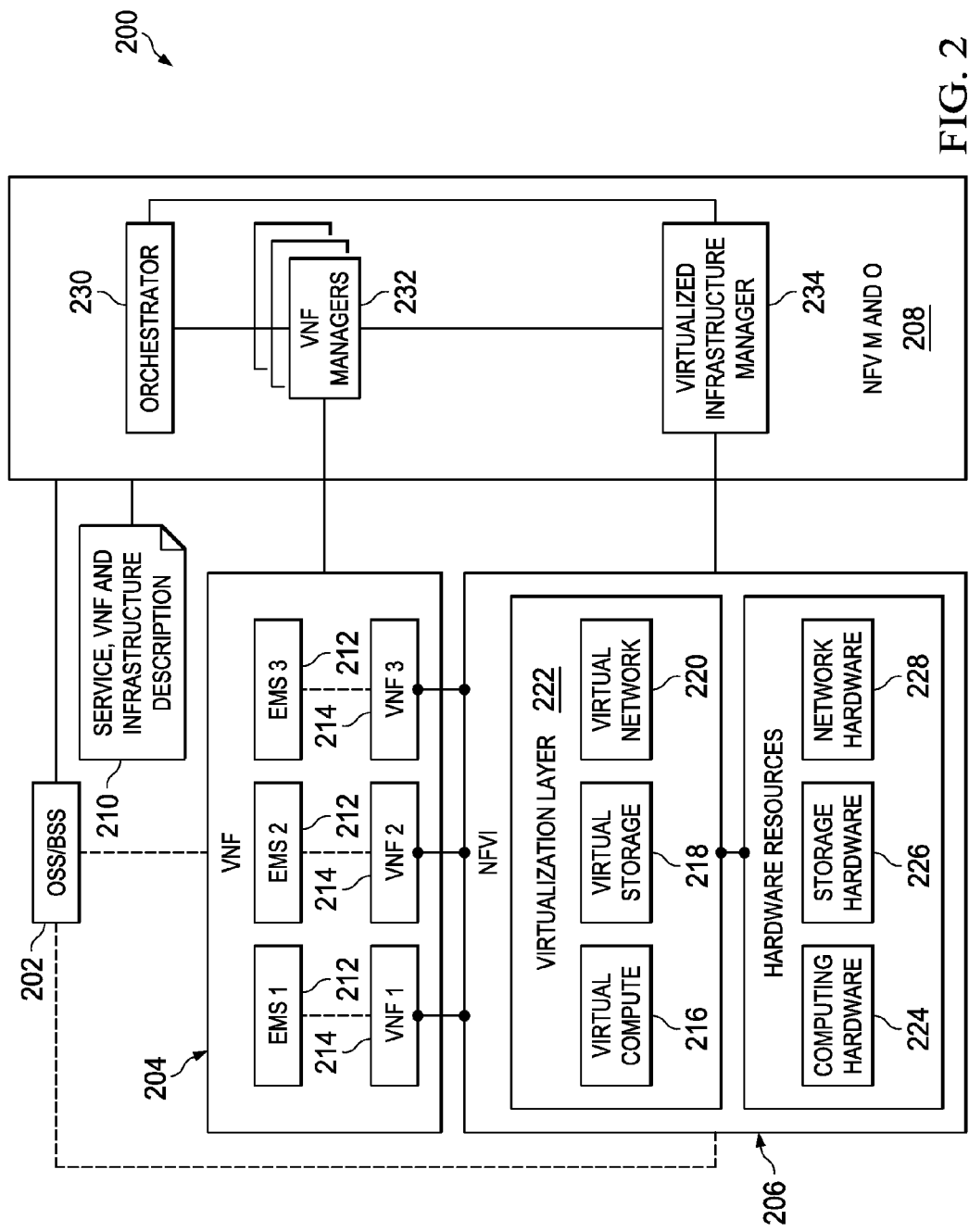
FIG. 2 is a schematic diagram of an embodiment of a network function virtualization framework.

FIG. 2 is a schematic diagram of an embodiment of a network function virtualization (NFV) framework 200 for implementing NFV. The NFV framework 200 may be used to implement VNFs for a host such as a host in service delivery network 170 in FIG. 1, a host in service delivery network 370 of FIG. 3, host 404 in FIG. 4, host 502 in FIG. 5, or network element 800 in FIG. 8. The NFV framework 200 comprises an operations support system (OSS)/business support system (BSS) module 202, a VNF module 204, network functions virtualization infrastructure (NFVI) module 206, and a NFV management & orchestration (M&O) module 208. A module may be a virtual element, a physical network element, or embedded in a physical network element. The OSS/BSS module 202 is configured to support management functions such as network inventory, service provisioning, networking configurations, and fault management. Further, the OSS/BSS module 202 is configured to support end-to-end telecommunication services. The OSS/BSS module 202 is configured to interact with the VNF module 204, the NFVI module 206, and the NVF M&O module 208. The VNF module 204 may be a software implementation of a network function which is capable of running over the NFVI module 206. The VNF module 204 may comprise element management systems (EMSs) 212 and VNFs 214. The EMSs 212 may be applicable to particular functions and are configured to manage a VNF 214 associated with the EMS 212. In an embodiment, the VNF module 204 may correspond with a network node in a system and may be free from hardware dependency. The NFVI module 206 is configured to provide virtual resources to support the execution of the VNFs. The NFVI module 206 may comprise customer-off-the-shelf (COTS) hardware, accelerator components where necessary, and a software layer which virtualized and abstracts the underlying hardware. For example, the NFVI module 206 may comprise a virtual compute module 216, a virtual storage module 218, a virtual network module 220, and a virtualization layer 222. The virtualization layer 222 may be operably coupled to hardware resources including, but not limited to, computing hardware 224, storage hardware 226, and network hardware 228. The NFV M&O module 208 is configured to orchestrate and to manage physical and/or software resources that support the infrastructure virtualization. The NFV M&O module 208 is configured to implement virtualization-specific management tasks for the NFV framework 200. The NFV M&O module 208 may be driven by a set of metadata 210 that describes services, VNFs, and infrastructure requirements. In an embodiment, the NFV M&O module 208 comprises an orchestration module 230, a VNF manager 232, and a virtualized infrastructure manager 234. The orchestration module 230, the VNF manager 232, and the virtualized infrastructure manager 234 are configured to interact with each other. Further, the VNF manager 232 may be configured to interact with and to manage the VNF module 204 and the virtualized infrastructure manager 234 may be configured to interact with and to manage the NFVI module 206. Additional information for the NFV framework 200 is described in the European Telecommunications Standards Institute (ETSI) white paper titled, "Network Functions Virtualisation (NFV)," by C. Cui, et al., published on Oct. 15, 2013, which is hereby incorporated by reference as if reproduced in its entirety.

Figure 3:
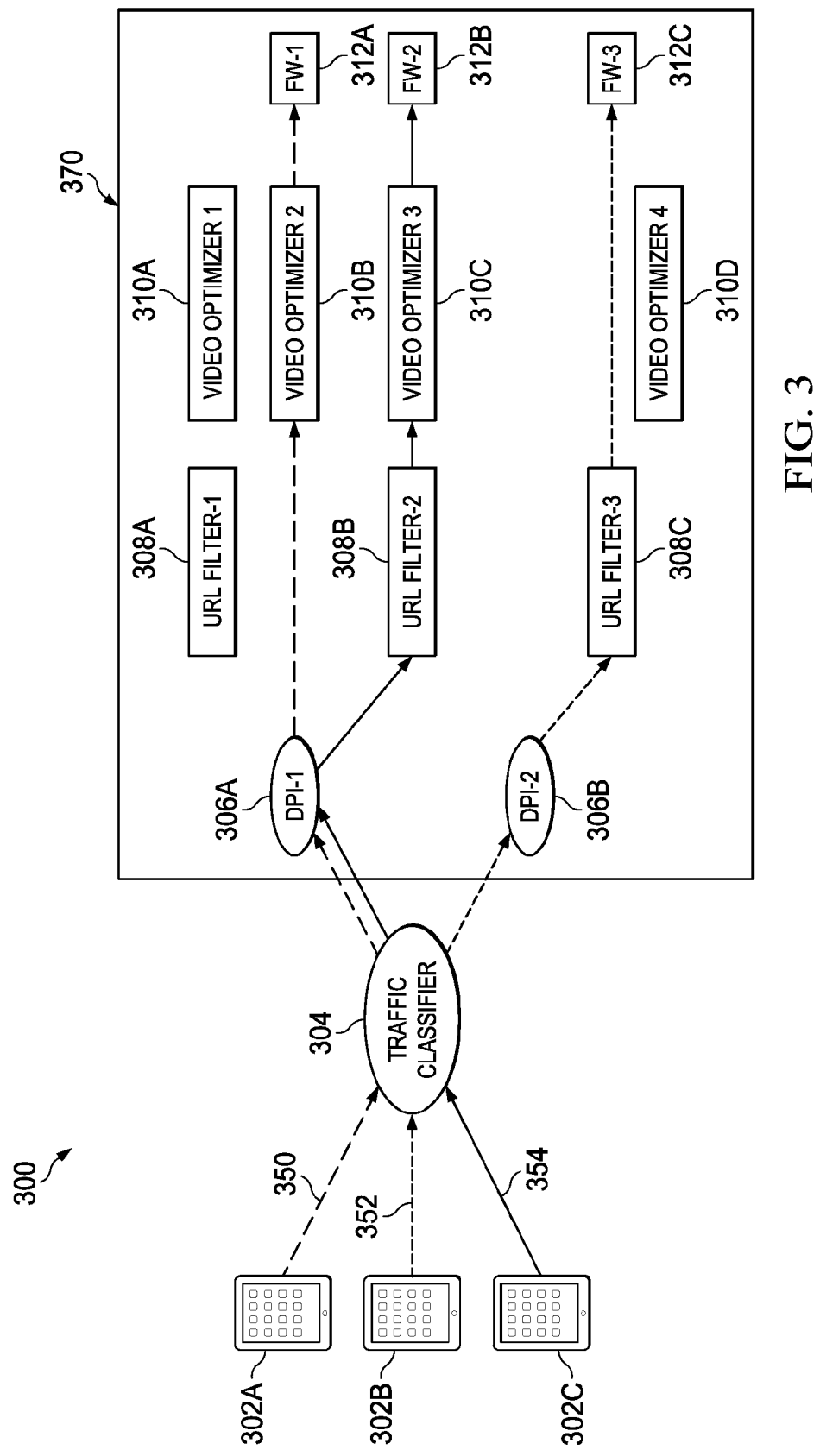
FIG. 3 is a schematic diagram of an embodiment of a network implementing service function chaining.

FIG. 3 is a schematic diagram of an embodiment of a network 300 implementing service function chaining. The network 300 comprises network devices 302A, 302B, and 302C, a traffic classifier 304, and a service delivery network 370 that is configured with a first DPI VNF 306A, a second DPI VNF 306B, a first uniform resource locator (URL) filter VNF 308A, a second URL filter VNF 308B, a third URL filter 308C, a first video optimizer VNF 310A, a second video optimizer VNF 310B, a third video optimizer VNF 310C, a fourth video optimizer VNF 310D, a first firewall VNF 312A, a second firewall VNF 312B, and a third firewall VNF 312C. The service delivery network 370 may comprise a plurality of hosts, such as a NE 800. Each host may comprise hardware resources to implement the VNFs. For example, each host may comprise a hypervisor configured to operate VMs that in turn operate VNFs. Examples of a hypervisor include, but are not limited to, VMware and Open vSwitch. Alternatively, any suitable hypervisor may be employed as would be appreciated by one of ordinary skill in the art upon viewing this disclosure. The service delivery network 370 may be configured similar to a service delivery network 170 of FIG. 1. The network 300 may be configured as shown or in any other suitable configuration. For example, the network 300 may comprise any other number of or configurations of VNFs.

Examples of network devices 302A, 302B, and 302C include, but are not limited to, network computers, tablet computers, desktop computers, mobile telephones, servers, or any other suitable networking device as would be appreciate by one of ordinary skill in the art upon viewing this disclosure. The traffic classifier 304 is configured to receive packets from network devices 302A, 302B, and 302C, to classify or identify the packets, and to forward the packets along service function chains based on their classification. For example, packets may be classified based on a port number or a subscriber identifier (ID). The first DPI VNF 306A and the second DPI VNF 306B are configured to receive packets from traffic classifier 304 and to inspect the payload of the packets. For example, the first DPI VNF 306A and the second DPI VNF 306B may be configured to inspect the packets for protocol non-compliance, viruses, spam, intrusions, user-defined criteria, or any other characteristics as would be appreciated by one of ordinary skill upon viewing this disclosure. The first URL filter VNF 308A, the second URL filter VNF 308B, and the third URL filter VNF 308C are configured to control access to content (e.g., Internet content) based on user-defined filters for the network devices 302A, 302B, and 302C. For example, the first URL filter VNF 308A, the second URL filter VNF 308B, or the third URL filter VNF 308C may restrict access to certain websites. The first video optimizer VNF 310A, the second video optimizer VNF 310B, the third video optimizer VNF 310C, and the fourth video optimizer VNF 310D are configured to optimize video content for the network devices 302A, 302B, and 302C. The first firewall VNF 312A, the second firewall VNF 312B, and the third firewall VNF 312C are configured to monitor and control incoming and outgoing network traffic based on predetermined security rules.

Network device 302A communicates traffic to the service delivery network 370 via the traffic classifier 304. Such communication could be accomplished by employing several schemes such as configuring the next-hop for network device 302A to be the traffic classifier 304, etc. The traffic classifier 304 classifies the traffic coming from network device 302A and then maps the traffic into a first service function chain 350 that comprises a path to the first DPI VNF 306A, the second video optimizer VNF 310B, and the first firewall VNF 312A. Similarly, traffic from network device 302B is forwarded to the service delivery network 370 via the traffic classifier 304. Such communication could be accomplished by employing several schemes such as configuring the next-hop for network device 302B to be the traffic classifier 304, etc. The traffic classifier 304 classifies the traffic coming from network device 302B and then maps the traffic into a second service function chain 352 that comprises a path to the second DPI VNF 306B, the third URL filter VNF 308C and the third firewall VNF 312C. Traffic from network device 302C is also forwarded to the service delivery network 370 via the traffic classifier 304.

Such communication could be accomplished by several schemes such as configuring the next-hop for network device 302C to be the traffic classifier 304, etc. The traffic classifier 304 classifies the traffic coming from network device 302C and then maps such traffic into a third service function chain 354 that comprises a path to the first DPI VNF 306A, the second URL filter VNF 308B, the third video optimizer VNF 310C followed by the second firewall VNF 312B. As with network 100, network 300 controls which services are applied to incoming packet flows by classifying the flows to a particular service chain, applying appropriate headers to the packets to indicate the associated service chain, and then routing the packets through the service delivery network 370 to each of the service functions along the associated service chain based on the headers.

Figure 4:
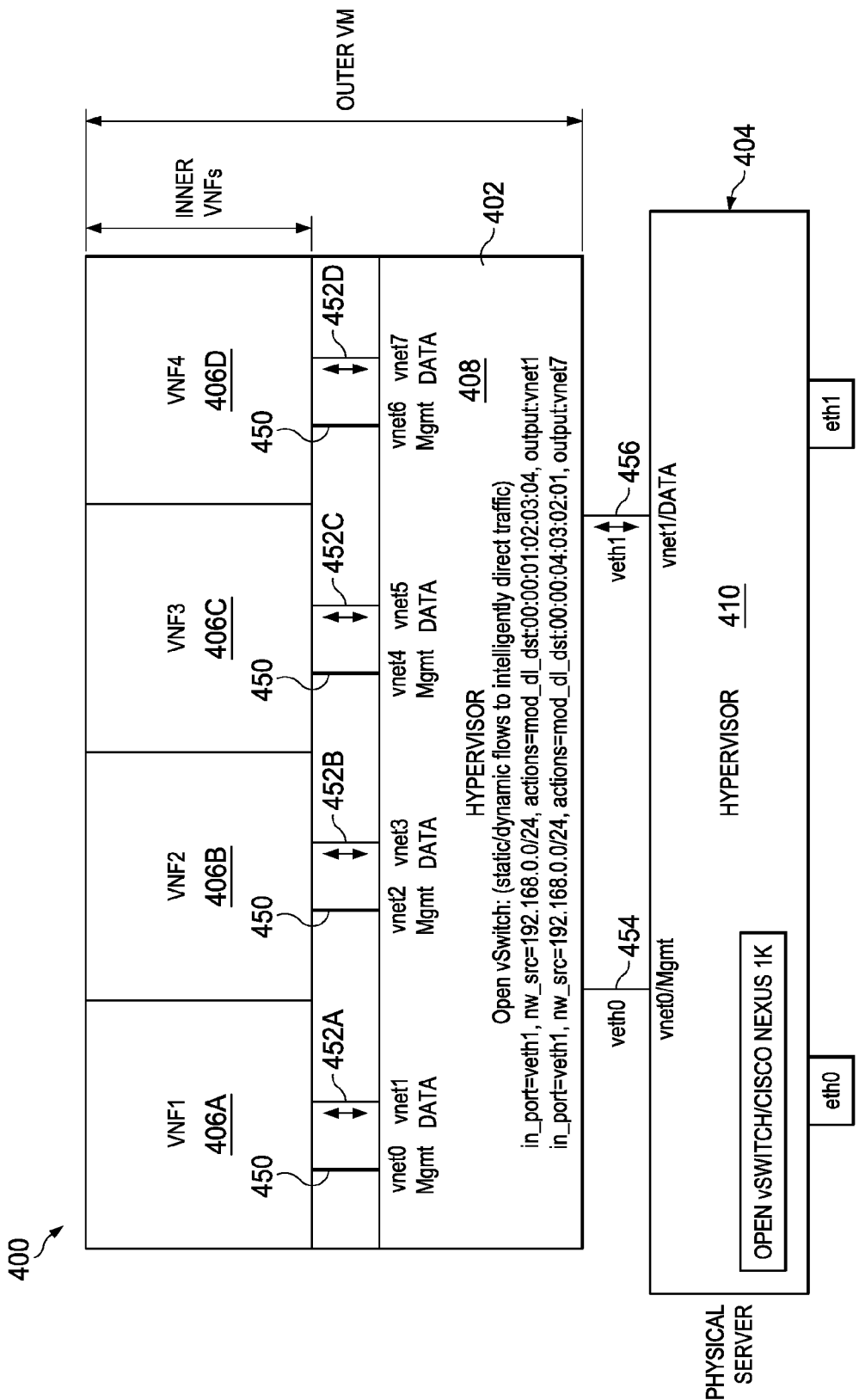
FIG. 4 is a schematic diagram of an embodiment of a host configuration for implementing a service function bundle using a host configured with a virtual machine comprising virtual network functions.

FIG. 4 is a schematic diagram of an embodiment of a host configuration 400 for implementing service function bundles using a host 404 configured with a VM 402 comprising VNFs 406A, 406B, 406C, and 406D. The host configuration 400 shows a host 404 implementing the VM 402. The host 404 may be configured to operate in a service delivery network and may be configured to operate a plurality of service chain functions and/or entire service function chains. The host may be configured to forward packets/flows through a plurality of VNFs without leaving the host, thus simplifying service delivery network routing. The host 404 comprises a first hypervisor 410 that is configured to control or manage the VM 402 and to provide a first set of routing instructions that provides routing information between the host 404 and the VM 402. The host 404 is in data communication with the VM 402 via a management (Mgmt) port 454 and a data port 456. The host 404 is configured to send control signals to the VM 402 using the management port 454 and to send and receive data from the VM 402 using the data port 454.

The VM 402 comprises a second hypervisor 408 operating in connection with the first hypervisor 410 and VNFs 406A, 406B, 406C, and 406D. The VM 402 may be configured to implement any number of or combinations of VNFs. For example, the VNFs may be nested VMs inside the VM 402 or the VNFs could be implemented as containers inside the VM 402. The VNFs 406A-406D may comprise any type of VNFs. For example, the VNFs 406A-406D may be configured as a DPI VNF, a video optimization VNF, a URL filter VNF, a firewall VNF, or any other suitable VNF. The second hypervisor 408 is configured to store and to provide second set of routing instructions for a flow through VNFs of the VM 402. The second set of routing instructions provides routing instructions between ports (e.g., data port 456) of the VM 402 and data ports 452A. 452B, 452C, and 452D of the VNFs. The second hypervisor 408 is configured to send control signals to the VNFs 406A-406D using management ports 450 and to send and receive data from the VNFs 406A-406D using data ports 452A-452D. Examples of a hypervisor include, but are not limited to, VMware and Open vSwitch. Alternatively, any suitable hypervisor may be employed as would be appreciated by one of ordinary skill in the art upon viewing this disclosure.

The host configuration 400 configures the host 404 and the first hypervisor 410 with the first set of routing instructions to forward the packets to the VM 402 and one or more VNFs 406A-406D, receive the processed packet from the VM 402, and forward the processed packet to another network device, host, or VM on the service delivery network and/or a VM on the host 404.

Figure 5:
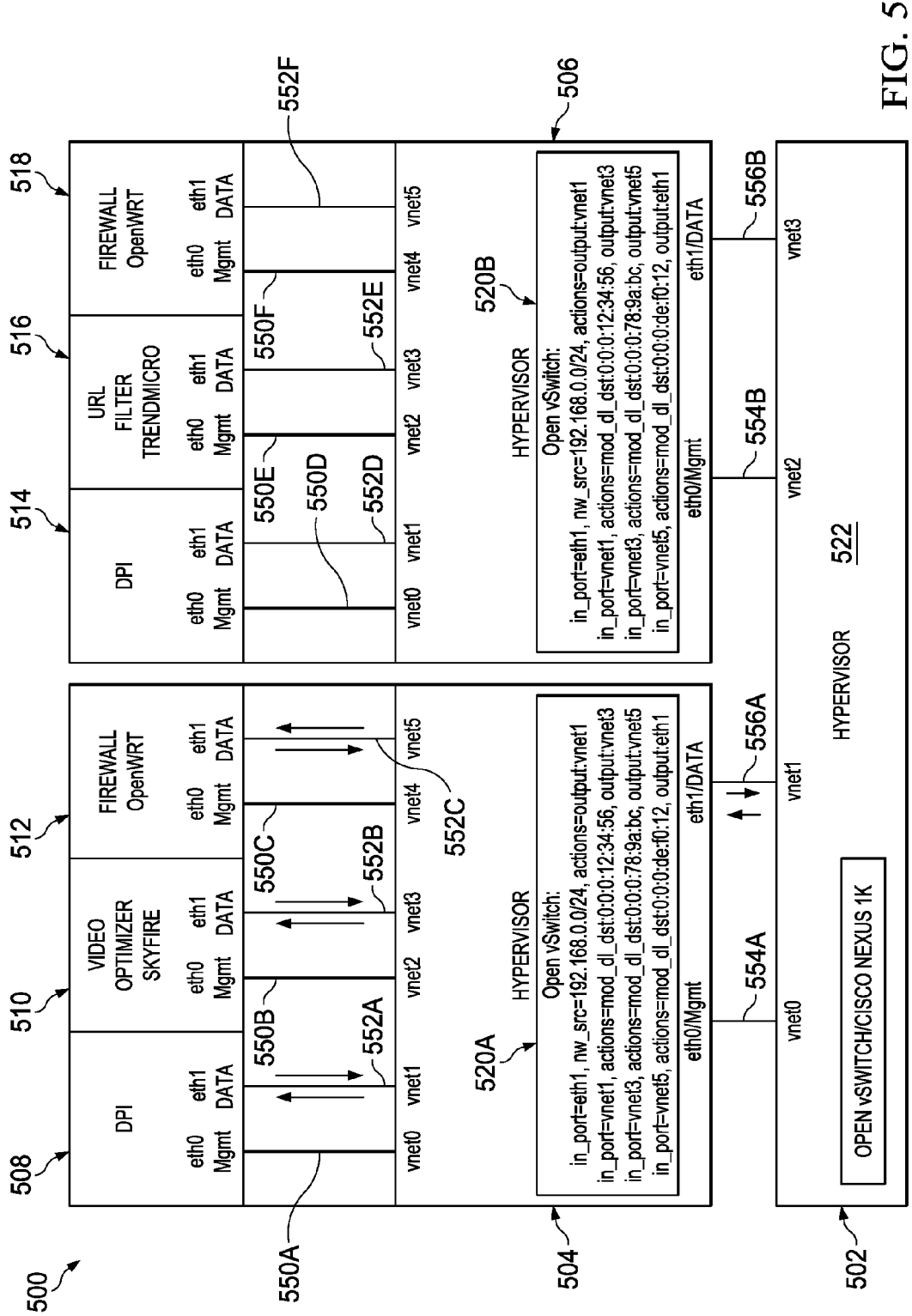
FIG. 5 is a schematic diagram of another embodiment of a host configuration for implementing a service function bundle using a host configured with virtual machines comprising virtual network functions.

FIG. 5 is a schematic diagram of another embodiment of a host configuration 500 for implementing a service function bundle using a host 502 configured with VMs comprising VNFs. The host configuration 500 shows a host 502 implementing a service function bundle using a first VM 504 and a second VM 506. The host 502 may be configured to implement any number of VMs and VNFs. The host 502 may be configured similarly to host 404 in FIG. 4. The host 502 comprises a first hypervisor 522 that is configured to control or manage the first VM 504 and the second VM 506 and to provide a first set of routing instructions that provides routing information between the host 502 and VM 504 and VM 506. The host 502 is in data communication with the first VM 504 and the second VM 506 via management ports 554A-556B and data ports 556A-556B. The host 502 is configured to send control signals to the first VM 504 and the second VM 506 using the management ports 554A-554B and to send and receive data from the first VM 504 and the second VM 506 using the data ports 556A-556B.

The first VM 504 comprises a second hypervisor 520A, a first DPI VNF 508, a video optimizer VNF 510, and a first firewall VNF 512. The second VM 506 comprises a third hypervisor 520B, a second DPI VNF 514, a URL filter VNF 516, and a second firewall VNF 518. The first VM 504 and the second VM 506 may be configured to implement any number of or combinations of VNFs. The second hypervisor 520A and the third hypervisor 520B are configured to store and to provide routing instructions for flows through the VNFs of the first VM 504 and the VNFs of the second VM 506, respectively. The routing instructions provided by the second hypervisor 520A and the third hypervisor 520B comprise routing instructions between ports (e.g., data port 556A-556B) of the first VM 504 and the second VM 506 and data ports 552A, 552B, 552C, 552D, 552E, and 552F of the VNFs. The second hypervisor 520A and the third hypervisor 520B are configured to send control signals to VNFs 508-518 using management ports 550A, 550B, 550C, 550D, 550E, and 550F and to send and receive data from the VNFs 508-518 using data ports 552A-552F.

As an example, the first hypervisor 522 is configured to forward packets to the first VM 504 using data port 556A. The first VM 504 receives the packets at the data port 556A and forwards the packets according to the second set of routing instructions provided by the second hypervisor 520A. The second set of routing instructions indicates to forward a packet to one or more VNFs based on several factors such as input port (port of the VM where the packet is received), or fields inside the packet such as MAC DA, MAC SA, source IP, destination, protocol, L4 ports, etc. For example, the second set of routing instructions comprises instructions that indicate to forward the packets from the data port 556A to the first DPI VNF 508 using the data port 552A. The first DPI VNF 508 receives the packets at data port 552A, processes the packets, and sends the processed packets back to the second hypervisor 520A using the data port 552A. The second hypervisor 520A is configured to receive the processed packets and to forward the processed packets in accordance with the second set of routing instructions to the video optimizer VNF 510 via the data port 552B. The video optimizer VNF 510 receives the packets at data port 552B, processes the packets, and sends the processed packets back to the second hypervisor 520A using the data port 552B. The second hypervisor 520A is configured to receive the processed packets and to forward the processed packets in accordance with the second set of routing instruction to the first firewall VNF 512 via the data port 552C. The first firewall VNF 512 receives the packets at the data port 552C, processes the packets, and sends the processed packets back to the second hypervisor 520A using the data port 552C. The second hypervisor 520A is configured to receive the processed packets and to forward the processed packets in accordance with the second set of routing instruction back to the first hypervisor 522 via the data port 556A.

Routing packets to one or more VNFs is simplified by using the routing instructions provided by the first hypervisor 522, the second hypervisor 520A, and the third hypervisor 520B. The host 502 uses the first hypervisor 522 and the first set of routing instructions to forward packets to a particular port on a VM to process the packets using one or more VNFs within the VM. The VM uses routing instructions provided by its hypervisor to forward the packets internally to process the packets using the one or more VNFs and to return the processed packets to the host 502. Routing instructions for processing packets using one or more VNFs are simplified by partitioning the routing instructions between the host 502, the first VM 504, and the second VM 506. The host 502, the first VM 504, and the second VM 506 may only store routing information for routing packets internally within the host 502, the first VM 504, and the second VM 506, respectively.

Figure 6:
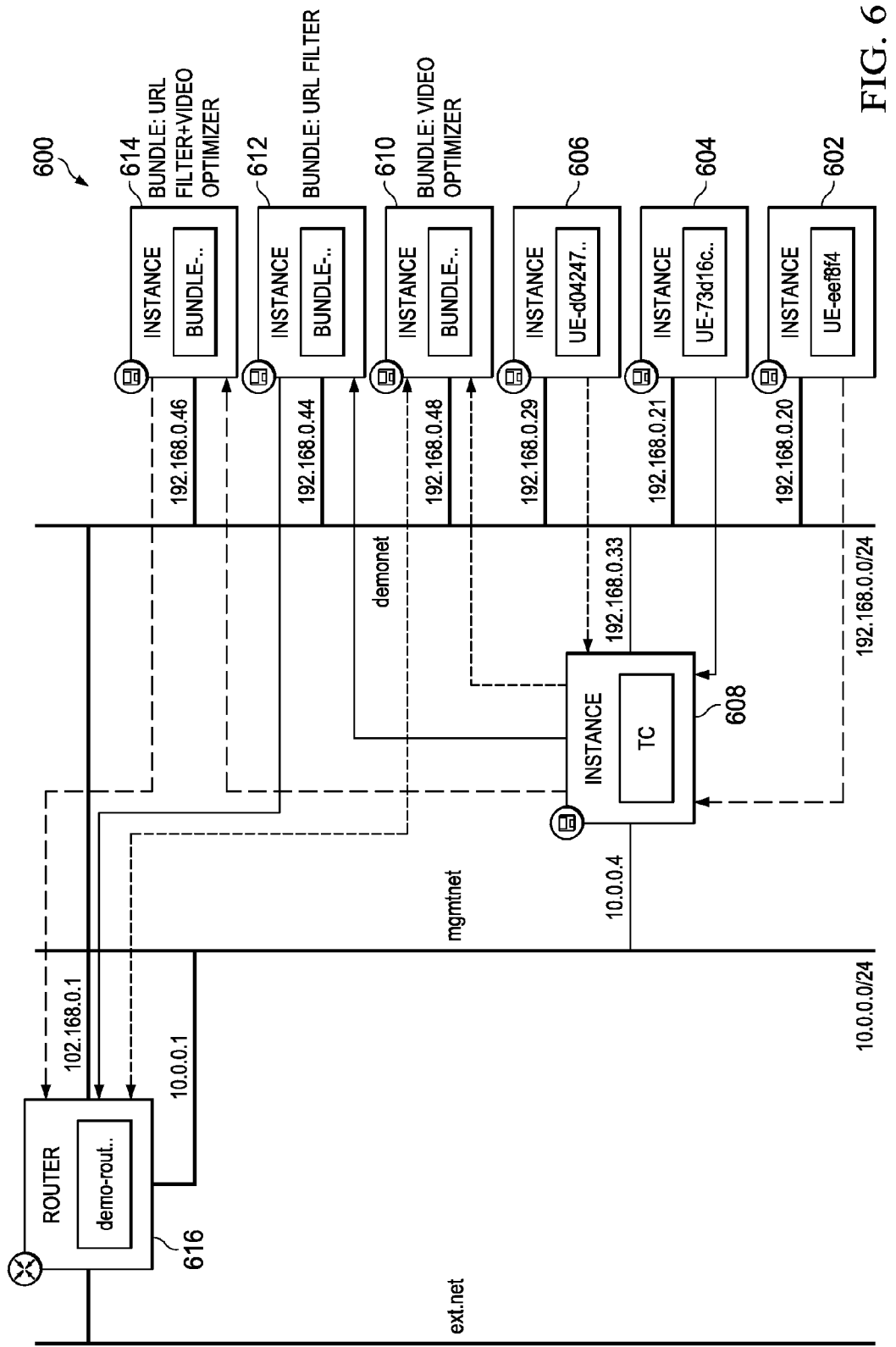
FIG. 6 is a schematic diagram of a network implementing service function chains using service function bundles.

FIG. 6 is a schematic diagram of a network 600 implementing service function chains using service function bundles. Network 600 comprises a first network device 602, a second network device 604, a third network device 606, a fourth network device 616, a traffic classifier 608, a first service function bundle 610, a second service function bundle 612, and a third service function bundle 614. Network 600 may be configured as shown or in any other suitable configuration. The first network device 602, the second network device 604, and the third network device 606 may be configured similar to network devices 302A, 302B, and 302C and the traffic classifier 608 may be configured similar to the service classifiers 110 or 122 in FIG. 1 or the traffic classifier 304 in FIG. 3. The traffic classifier 608 is configured to receive packets from the first network device 602, the second network device 604, and the third network device 606, to process the packet to determine a service function bundle to forward the packet to, and to forward the packet to a host that is configured with the selected service function bundle. The first service function bundle 610, the second service function bundle 612, and the third service function bundle 614 may be implemented using a VM in a host. In an embodiment, the first service function bundle 610, the second service function bundle 612, and the third service function bundle 614 are each stored in different VMs or host. The host may be configured similar to host 404 in FIG. 4 or host 502 in FIG. 5. The first service function bundle 610, the second service function bundle 612, and the third service function bundle 614 are configured to receive packets from the traffic classifier 608, to process the packets using one or more VNFs, and to forward the processed packets to the fourth network device 616. The first service function bundle 610 is configured as a video optimizer bundle and comprises a DPI module, a video optimizer VNF, and a firewall VNF. The second service function bundle 612 is configured as a URL filter bundle and comprises a DPI module, a URL filter VNF, and a firewall VNF. The third service function bundle 614 is configured as a URL filter and video optimizer bundle and comprises a DPI module, a URL filter VNF, a video optimizer VNF, and a firewall VNF. In an embodiment, a load balancer may be assigned to one or more service function bundles. The load balancer is configured to balance the load at the service function bundle level rather than at the individual VNF level. The fourth network device 616 is configured to receive processed packets from the first service function bundle 610, the second service function bundle 612, and the third service function bundle 614 and to transmit the packets to other network devices or to another network. An example of the fourth network device 616 includes, but is not limited to, a router.

Figure 7:
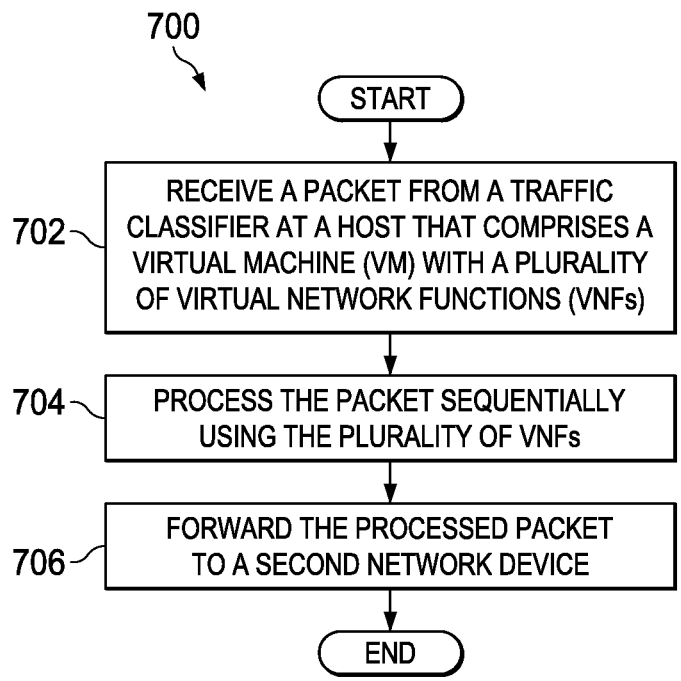
FIG. 7 is a flowchart of an embodiment of a forwarding method for a service function bundle.

FIG. 7 is a flowchart of an embodiment of a forwarding method 700 for a service function bundle. Method 700 is employed by a host for implementing service function bundles. The host comprises a first hypervisor and a VM that comprises a second hypervisor and a plurality of VNFs that are routed within the VM. The first hypervisor is configured to provide a first set of routing instructions that provides routing information between the host and the VM. The second hypervisor is configured to provide a second set of routing instructions that provides routing instructions between ports on the VM and data ports on VNFs. The second set of routing instructions comprises instructions to forward processed packets back to the data port on the VM where the packet was received. In an embodiment, the second set of routing instructions routes packets among the VNFs by mapping incoming ports where the packet is received to outgoing ports to forward the packet. Method 700 may be implemented by a host such as a host 404 in FIG. 4 or host 502 in FIG. 5. Method 700 may be employed to implement a portion of a service function chain using the VNFs within the VM.

At step 702, the host receives a packet from a traffic classifier. The traffic classifier may be configured similar to the service classifiers 110 or 122 in FIG. 1 or the traffic classifier 304 in FIG. 3.

At step 704, the host forwards the packet to a port on the VM using the first set of routing instructions provided by the first hypervisor. For example, the host may forward the packet to the port on the VM based on the port of the host where the packet is received. In alternate embodiments, the host may forward the packet based on other packet fields such as MAC source address, MAC destination address, IP source address, IP destination address, packet communication protocol used, layer four port used, etc. The VM forwards the packet sequentially to one or more of the VNFs from the plurality of VNFs in accordance with second set of routing instructions that is provided by the second hypervisor. For example, the VM forwards the packet to a data port on a VNF and received the processed back from the VNF via the data port. The VM repeats this process for all the VNFs along a service chain in accordance with the second set of routing instructions. The VM forwards the processed packet back to the first hypervisor and the host via the port on the VM where the packet was originally received. Optionally, the host may forward the packet to be processed by one or more other VMs that are attached to the host in accordance with the first set of routing instructions. The packet may be processed by the VNFs of the additional VMs in accordance with routing instructions provided by their respective hypervisors.

At step 706, the host forwards the processed packet to a second network device along a service function chain. For example, the second network device may be a router, a network device such as network devices 302A-302C in FIG. 3 or network devices 602-606 in FIG. 6, or any network device configured to implement another service function or another service function bundle.

Figure 8:
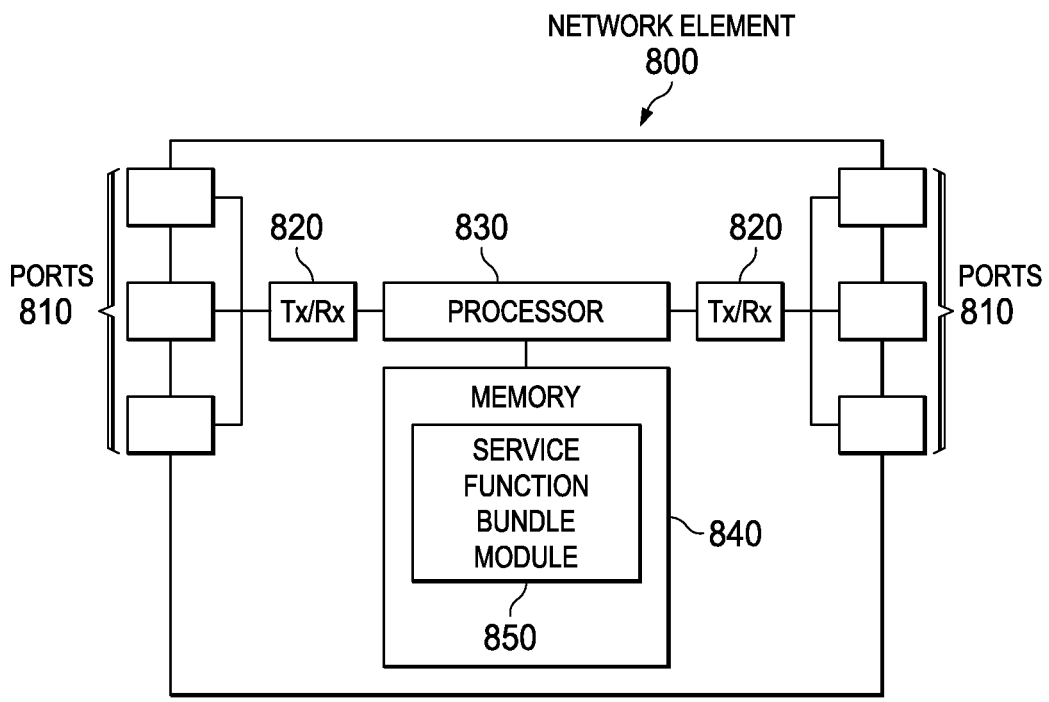
FIG. 8 is a schematic diagram of an embodiment of a network element configured to implement service function bundling.

FIG. 8 is a schematic diagram of an embodiment of a network element 800 configured to implement service function bundling. The network element 800 may be suitable for implementing the disclosed embodiments. Network element 800 may be any device (e.g., a modem, a switch, a router, a bridge, a server, a client, a controller, a computer, etc.) that transports or assists with transporting data through a network, system, and/or domain. For example, network element 800 may be implemented in a host such as a host in a service delivery network 170 in FIG. 1, in a service delivery network 370 of FIG. 3, host 404 in FIG. 4, or host 502 in FIG. 5. Network element 800 comprises ports 810, transceiver units (Tx/Rx) 820, a processor 830, and a memory 840 comprising a service function bundle module 850. Ports 810 are coupled to Tx/Rx 820, which may be transmitters, receivers, or combinations thereof. The Tx/Rx 820 may transmit and receive data via the ports 810. Processor 830 is operably coupled to the Tx/Rx 820 and is configured to process data. Memory 840 is operably coupled to processor 830 and is configured to store data and instructions for implementing embodiments described herein. The network element 800 may also comprise electrical-to-optical (EO) components and optical-to-electrical (OE) components coupled to the ports 810 and Tx/Rx 820 for receiving and transmitting electrical signals and optical signals.

The processor 830 may be implemented by hardware and software. The processor 830 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 830 is in communication with the ports 810, Tx/Rx 820, and memory 840.

The memory 840 comprises one or more of disks, tape drives, or solid-state drives and may be used as an over-flow data storage device, to store programs when such programs are selected for execution, and to store instructions and data that are read during program execution. The memory 840 may be volatile and non-volatile and may be read-only memory (ROM), random-access memory (RAM), ternary content-addressable memory (TCAM), or static random-access memory (SRAM). Service function bundle module 850 is implemented by processor 830 to execute the instructions for implementing service function bundles using a VM that comprises a plurality of service functions or VNFs that are routed within the service function bundle. The service function bundle module 850 may implement service function bundles using a method similar to method 700 in FIG. 7. Further, the service function bundle module 850 is configured to implement a hypervisor for a host, a VM, a hypervisor for a VM, and one or more VNFs. The inclusion of service function bundle module 850 provides an improvement to the functionality of network element 800. Service function bundle module 850 also effects a transformation of network element 800 to a different state. Alternatively, service function bundle module 850 is implemented as instructions stored in the processor 830.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A packet forwarding method comprising:
   receiving a packet from a traffic classifier at a host that comprises:
      a virtual machine (VM); and
      a first hypervisor for the host that provides a first set of routing instructions that provides routing instruction to forward the packet to a port of the VM; and
      wherein the VM comprises:
         a plurality of virtual network functions (VNFs); and
         a second hypervisor for the VM that provides a second set of routing instructions that provides routing instructions to forward the packet to the plurality of VNFs;
   processing, by the host, the packet using the plurality of VNFs in accordance with the first set of routing instructions and the second set of routing instructions; and
   forwarding, by the host, the processed packet to a network device.

2. The method of claim 1, wherein the first set of routing instructions only provides routing information for forwarding packets between the host and the VM.

3. The method of claim 1, wherein the second set of routing instructions comprises instructions to forward the processed packet to the port where the packet is received after processing the packet using the plurality of VNFs.

4. The method of claim 1, wherein the first set of routing instructions associates the port with the plurality of VNFs.

5. The method of claim 1, wherein the second set of routing instructions maps an outgoing port to forward the packet to an incoming port, a Media Access Control (MAC) source address, a MAC destination address, Internet Protocol (IP) source address, an IP destination address, a protocol of the packet, or combinations thereof.

6. The method of claim 1, wherein the second set of routing instructions only provides routing information for forwarding packets between the port and a data port on each of the VNFs from the plurality of VNFs.

7. The method of claim 1, wherein processing the packet using the plurality of VNFs comprises:
   receiving the packet from the VM at a data port of a VNF of the plurality of VNFs;
   processing the packet using the VNFs; and
   forwarding the processed packet back to the VM via the data port.

8. A host comprising:
   a receiver configured to receive a packet from a traffic classifier;
   a transmitter configured to forward a processed packet to a network device;
   a memory; and
   a processor operably coupled to the receiver, the transmitter, and the memory, and configured to:
      implement a virtual machine (VM) and a first hypervisor for the host that provides a first set of routing instructions that provides routing instruction to forward the packet to a port of the VM, wherein the VM comprises:
         a plurality of virtual network functions (VNFs); and a second hypervisor for the VM that provides a second set of routing instructions that provides routing instructions to forward the packet to the plurality of VNFs based on the port of the VM where the packet is received; and process the packet using the plurality of VNFs in accordance with the first set of routing instructions and the second set of routing instructions.

9. The host of claim 8, wherein the first set of routing instructions only provides routing information for forwarding packets between the host and the VM.

10. The host of claim 8, wherein the second set of routing instructions comprises instructions to forward the processed packets to the port where the packet is received after processing the packet using the plurality of VNFs.

11. The host of claim 8, wherein the first set of routing instructions associates the port with the plurality of VNFs.

12. The host of claim 8, wherein the second set of routing instructions maps an outgoing port to forward the packet to an incoming port, a Media Access Control (MAC) source address, a MAC destination address, Internet Protocol (IP) source address, an IP destination address, a protocol of the packet, or combinations thereof.

13. The host of claim 8, wherein the second set of routing instructions only provides routing information for forwarding packets between the port and a data port on each of the VNFs from the plurality of VNFs.

14. The host of claim 8, wherein processing the packet using the plurality of VNFs comprises:
receiving the packet from the VM at a data port of a first of the plurality of VNFs;
processing the packet using the first VNF; and
forwarding the processed packet back to the VM via the data port for processing at a second of the plurality of VNFs.

15. A packet forwarding method comprising:
receiving a packet from a traffic classifier at a host that comprises:
a virtual machine (VM); and
a first hypervisor for the host that provides a first set of routing instructions that provides routing information between the host and the VM; and wherein the VM comprises:
a plurality of virtual network functions (VNFs); and
a second hypervisor for the VM that provides a second set of routing instructions that provides routing instructions between a port on the VM and a data port on each VNF from a plurality of VNFs; and processing, by the host, the packet using the VNFs in accordance with the first set of routing instructions and the second set of routing instructions, wherein the first set of instructions provides routing instructions to forward the packet to the port of the VM, and wherein the second set of routing instructions provides routing instructions to forward the packet to the plurality of VNFs based on the port of the VM where the packet is received; and forwarding, by the host, the processed packet to a network device.

16. The method of claim 15, wherein the second set of routing instructions comprises instructions to forward the processed packet to the port where the packet is received after processing the packet using the plurality of VNFs.

17. The method of claim 15, wherein the second set of routing instructions maps a source address of the packet to an outgoing port to forward the packet.

18. The method of claim 15, wherein the second set of routing instructions maps an incoming port where the packet is received to an outgoing port to forward the packet.

19. The method of claim 15, wherein the first set of routing instructions does not comprise instructions for forwarding the packet among the plurality of VNFs within the VM.

20. The method of claim 15, wherein processing the packet using the plurality of VNFs comprises:
receiving the packet from the VM at a data port of a VNF from the plurality of VNFs;
processing the packet using the VNF; and
forwarding the processed packet back to the VM via the data port.

* * * * *